United States Patent Office 2,835,680
Patented May 20, 1958

2,835,680

Δ⁸⁽⁹⁾-STEROIDS AND THEIR PROCESS OF PREPARATION

Josef Fried, New Brunswick, N. J., assignor to Olin Mathieson Chemical Corporation, New York, N. Y., a corporation of Virginia No Drawing. Application July 7, 1954
Serial No. 441,932

13 Claims. (Cl. 260—397.3)

This invention relates to the synthesis of valuable steroids; and has for its objects the provision of (I) an advantageous process of preparing steroids of the pregnane (including the pregnene and allopregnane) series, and of (II) certain new steroids useful as physiologically-active steroids and as intermediates for the preparation of physiologically-active steroids.

The process of this invention comprises essentially dehydrohalogenating a 9α-halo-11-keto steroid of the pregnane (including pregnene and allopregnane) series to the corresponding Δ⁸⁽⁹⁾-11-keto steroid of the pregnane series.

The Δ⁸⁽⁹⁾-11-keto steroids of the pregnane series are new compounds which have adrenocortical activity.

The steroids useful as starting materials in the practice of this invention are disclosed in J. Am. Chem. Soc. 75, 2273 (1953), and also in my U. S. application Serial No. 417,489, filed March 10, 1954, and are represented by the following general formula:

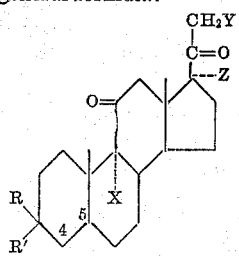

wherein the 4,5 position is double-bonded or saturated (the 4,5-double-bonded steroids being preferred), and wherein R is hydrogen, R' is hydroxy, or together R and R' is oxo (keto) or a group convertible thereto by hydrolysis (e. g. acetal), R and R' as oxo being preferred; Z is hydrogen or α-hydroxy; X is halo (preferably bromo); and Y is hydrogen, halogen, hydroxy, or OR'', where R'' is an acyl radical or a hydrocarbon radical, the former being exemplified by a carboxy radical such as lower alkanoyl (e. g. acetyl propionyl, and butyryl) and aroyl (e. g. benzoyl and naphthoyl), and the latter by lower alkyl (e. g. methyl, ethyl, and propyl) and aralkyl (e. g. benzyl and phenethyl).

These starting materials are reacted in accordance with the process of this invention to produce the new steroids represented by the following general formula

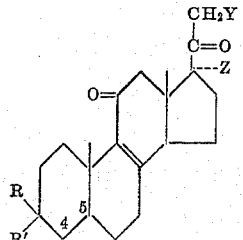

wherein the 4,5-position is double-bonded or saturated (the 4,5-double-bonded steroids being preferred), and wherein R, R' Z and Y are as above-defined. When Y is R''O, the compounds can be hydrolyzed by means of dilute base or acid to form the corresponding free 21-hydroxy derivatives.

Compounds suitable as initial reactants in the process of this invention include, inter alia, 9α-bromo-cortisone 21-acetate (or other carboxylic acid ester), 9α-bromo-11-keto-progesterone, 9α-bromo-11-keto 21-hydroxyprogesterone 21-acetate (or other carboxylic acid ester); 9α-bromo-11-keto-17α-hydroxy-progesterone; and the corresponding 9α-chloro, fluoro and iodo compounds.

The steroids formed by the practice of this invention include, inter alia, Δ⁸⁽⁹⁾-dehydrocortisone 21-acetate (or other carboxylic acid esters), Δ⁴,⁸⁽⁹⁾-pregnadiene-3,11,20-trione; 11-keto-21-hydroxy-Δ⁸⁽⁹⁾-dehydroprogesterone 21-acetate (or other carboxylic acid ester); and 11-keto-17α-hydroxy-Δ⁸⁽⁹⁾-dehydroprogesterone.

The Δ⁸⁽⁹⁾-steroids of the pregnane series are formed from the corresponding 9α-halo-steroids by heating the latter, preferably to reflux, in the presense of a nitrogenous base, such as a lower-alkyl substituted pyridine (e. g., picoline, lutidine, collidine, etc. A collidine is particularly preferred. The resulting Δ⁸⁽⁹⁾-steroid is then separated by extraction and evaporation of the extracting agent.

The following examples are illustrative of the invention (all temperatures being in centigrade):

EXAMPLE 1

Δ⁸⁽⁹⁾-dehydrocortisone acetate

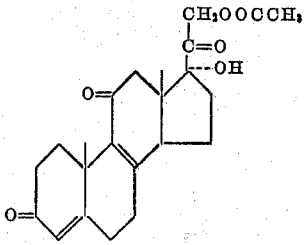

A suspension of 102 mg. Δ⁴-9α-bromopregnene-17α, 21-diol-3,11,20-trione 21-acetate in ½ ml. of freshly distilled collidine is refluxed for ten minutes. The resulting mixture is diluted with chloroform and extracted with dilute sulfuric acid, water, sodium bicarbonate and again with water. The chloroform extract on evaporation to dryness in vacuo leaves about 76.7 mg. of a crystalline residue which is recrystallized from 95% ethanol with the aid of Darco. The pure Δ⁸⁽⁹⁾-dehydrocortisone acetate melts at 248–249° C. with browning, and has [α]$_D^{23}$ +412° (c., 0.67 in chloroform);

$\lambda_{max.}^{alc.}$ 235 mμ (ε=17,200);

$\lambda_{max.}^{Nujol}$ 2.96μ, 5.72μ, 5.88μ, 6.06μ, 6.26μ, 6.35μ

Analysis.—Calcd. for $C_{23}H_{28}O_6$: C, 68.98; H, 7.05. Found: C, 68.81; H, 7.28.

This substance possesses about 0.4 times the activity of cortisone acetate in the rat liver glycogen assay.

Δ⁸⁽⁹⁾-dehydrocortisone acetate may be hydrolyzed with sodium methylate in methanol to form Δ⁸⁽⁹⁾-dehydrocortisone.

EXAMPLE 2

Δ⁴,⁸⁽⁹⁾-pregnadiene-21-ol-3,11,20-trione 21-acetate
[11-keto-21-acetoxy-Δ⁸⁽⁹⁾-dehydroprogesterone]

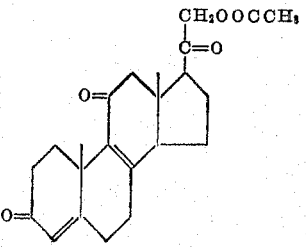

A solution of 31 mg. of 9α-bromo-11-dehydrocorticosterone acetate in 0.25 ml. of freshly distilled s-collidine is refluxed for 10 minutes. The reaction mixture is diluted with chloroform and the resulting solution extracted with dilute sulfuric acid. The extract is washed with water, sodium bicarbonate and again with water and dried over sodium sulfate. Evaporation in vacuo leaves a residue (about 29.2 mg.) which is dissolved in 2 ml. of benzene and 0.5 ml. of hexane and chromatographed on 600 mg. of sulfuric acid-washed alumina. Elution of the column with benzene (200 ml.) and with benzene-chloroform 3:1 affords essentially pure $\Delta^{4,8(9)}$-pregnadiene-21-ol-3,11,20-trione 21-acetate. After two recrystallizations from acetone-hexane the material melts at 149–150° C.; $[\alpha]_D^{23}$ +408° (c., 0.55 in chloroform);

$\lambda_{max.}^{alc.}$ 235 mμ (ε=18,500), shoulder at 245 mμ (ε=17,300)

*Analysis.*—Calcd. for $C_{23}H_{28}O_5$ (384.45): C, 71.85; H, 7.34. Found: C, 71.88; H, 7.23.

$\Delta^{4,8(9)}$-pregnadiene-21-ol-3,11,20-trione 21-acetate may be hydrolyzed by treatment with sodium methylate to form $\Delta^{4,8(9)}$-pregnadiene-21-ol-3,11,20-trione.

EXAMPLE 3

*11-keto$\Delta^{8(9)}$-dehydroprogesterone [$\Delta^{4,8(9)}$-pregnadiene-3,11,20-trione]*

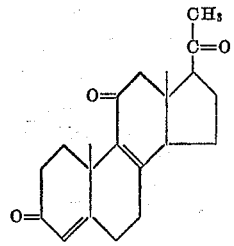

30.5 mg. of 9α-bromo-11-ketoprogesterone is treated with 0.25 ml. of collidine as described in Example 1. The resulting crude product (about 26.2 mg.); is taken up in 2 ml. of benzene and 0.5 ml. of hexane and chromatographed on 500 mg. of sulfuric acid-washed alumina. Elution of the column with benzene-hexane 4:1 and eventually with benzene yields crude $\Delta^{8(9)}$-dehydro-11-ketoprogesterone, which after 3 recrystallizations from acetone-hexane melts at 193–194° C.; $[\alpha]_D^{23}$+541° (c., 0.27 in chloroform);

$\lambda_{max.}^{alc.}$ 235 mμ (ε=21,100), shoulder at 248 mμ (ε=18,200)

*Analysis.*—Calcd. for $C_{21}H_{26}O_3$ (326.42): C, 77.27; H, 8.03. Found: C, 77.26; H, 7.88.

In a similar manner, 9α-bromo-11-keto-17α-hydroxyprogesterone can be converted to 11-keto-17α-hydroxy-$\Delta^{8(9)}$-dehydroprogesterone.

The invention may be otherwise embodied within the scope of the appended claims.

I claim:
1. The process for dehydrohalogenating a 9α-halo-11-keto steroid of the pregnane series which comprises heating said steroid in the presence of a lower-alkyl substituted pyridine, and recovering the steroid formed.
2. The process of claim 1 wherein the pyridine is collidine.
3. The process for dehydrobrominating a 9α-bromo-11-keto steroid of the pregnane series which comprises heating said steroid in the presence of a lower-alkyl substituted pyridine, and recovering the steroid formed.
4. The process for dehydrohalogenating a 9α-halo-3,11,20-triketo-steroid of the $\Delta^4$-pregnene series which comprises heating said steroid in the presence of a lower-alkyl substituted pyridine, and recovering the steroid formed.
5. The process for producing $\Delta^{8(9)}$-dehydrocortisone acetate which comprises heating 9α-bromocortisone acetate in the presence of a lower-alkyl substituted pyridine, and recovering the $\Delta^{8(9)}$-dehydrocortisone acetate thus formed.
6. The process for producing $\Delta^{4,8(9)}$-pregnadiene-21-ol-3,11,20-trione 21-acetate which comprises heating 9α-bromo-11-dehydrocortisone acetate in the presence of a lower-alkyl substituted pyridine, and recovering the $\Delta^{4,8(9)}$-pregnadiene-21-ol-3,11,20-trione thus formed.
7. The process for producing $\Delta^{8(9)}$-dehydro-11-ketoprogesterone which comprises heating 9α-bromo-11-ketoprogesterone in the presence of a lower-alkyl substituted pyridine and recovering the $\Delta^{8(9)}$-dehydro-11-ketoprogesterone thus formed.
8. A steroid of the general formula

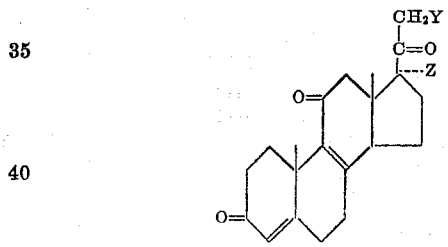

wherein Z is a radical selected from the group consisting of hydrogen and hydroxy and Y is a radical selected from the group consisting of hydrogen, hydroxy, lower alkanoyloxy and aroyloxy.
9. $\Delta^{4,8(9)}$-3,11,20-triketo-17-hydroxy-21-acetoxy - pregnadiene.
10. $\Delta^{4,8(9)}$-3,11,20-triketo - 17,21 - dihydroxy - pregnadiene.
11. $\Delta^{4,8(9)}$-pregnadiene-21-ol-3,11,20-trione 21-acetate.
12. $\Delta^{4,8(9)}$-pregnadiene-21-ol-3,11,20-trione.
13. $\Delta^{8(9)}$-dehydro-11-ketoprogesterone.

References Cited in the file of this patent
UNITED STATES PATENTS 2,409,798    Reichstein _____ Oct. 22, 1946